United States Patent
Hejl et al.

(10) Patent No.: US 9,000,078 B2
(45) Date of Patent: Apr. 7, 2015

(54) FLUOROALKYL PHOSPHONATE COMPOSITION

(71) Applicants: Dow Global Technologies LLC, Midland, MI (US); Rohm and Haas Company, Philadelphia, PA (US)

(72) Inventors: Andrew Hejl, Lansdale, PA (US); Arkady L. Krasovskiy, Midland, MI (US); Partha S. Majumdar, Lansdale, PA (US); Mark R. Winkle, Lansdale, PA (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/052,850

(22) Filed: Oct. 14, 2013

(65) Prior Publication Data
US 2014/0107267 A1  Apr. 17, 2014

Related U.S. Application Data

(60) Provisional application No. 61/714,480, filed on Oct. 16, 2012.

(51) Int. Cl.
*C09D 7/12* (2006.01)
*C09D 5/02* (2006.01)

(52) U.S. Cl.
CPC ............. *C09D 7/1233* (2013.01); *C09D 5/02* (2013.01)

(58) Field of Classification Search
CPC ................................... C09D 7/12; C09D 5/02
USPC ........................................................ 524/130
See application file for complete search history.

(56) References Cited

U.S. PATENT DOCUMENTS

| | | | |
|---|---|---|---|
| 3,083,224 A * | 3/1963 | Brace et al. | 558/204 |
| 3,891,591 A | 6/1975 | Chang et al. | |
| 6,271,289 B1 | 8/2001 | Longoria et al. | |
| 7,385,077 B1 | 6/2008 | Acosta et al. | |
| 7,399,887 B1 | 7/2008 | Murphy et al. | |
| 7,470,818 B2 | 12/2008 | Peng et al. | |
| 7,815,816 B2 | 10/2010 | Peng et al. | |
| 8,022,238 B2 | 9/2011 | Peng et al. | |
| 8,313,573 B2 * | 11/2012 | Kaneumi et al. | 106/38.22 |
| 2008/0113085 A1 | 5/2008 | Peng et al. | |
| 2008/0145552 A1 | 6/2008 | Berrettini et al. | |
| 2009/0038510 A1 | 2/2009 | Acosta et al. | |
| 2009/0286885 A1 | 11/2009 | Qiu et al. | |
| 2011/0200815 A1 | 8/2011 | Peng et al. | |
| 2012/0178075 A1 * | 7/2012 | Kaneumi et al. | 435/1.1 |

FOREIGN PATENT DOCUMENTS

CA     2071596 A1    1/1993
WO     WO 2011105347 A1 *  9/2011

* cited by examiner

*Primary Examiner* — Michael M Bernshteyn
(74) *Attorney, Agent, or Firm* — Reid S. Willis

(57) ABSTRACT

The present invention is a composition comprising an aqueous dispersion of a binder and a salt of the following fluoroalkyl phosphonic acid:

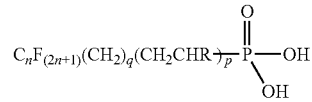

wherein n, q, and p are as described herein. The composition of the present invention is useful as a block additive in coating compositions.

6 Claims, No Drawings

FLUOROALKYL PHOSPHONATE COMPOSITION

BACKGROUND OF THE INVENTION

The present invention relates to a composition comprising a fluoroalkyl phosphonate and a binder.

Block resistance is the capability of a paint not to stick to itself. For example, good block resistance helps keep a door from sticking to the door jamb or a window from sticking to its frame. Block resistance is achieved in waterborne paint formulations through block additives such as fluorinated alkyl surfactant that contains a high concentration of fluorine. These highly fluorinated compounds typically give better performance in architectural coatings compositions than those containing lower fluorine levels. Unfortunately, the better performing surfactants are more costly to produce and tend to be environmentally unfriendly. One such popular class of surfactants is fluroalkyl phosphates, which suffer from a number of drawbacks: Fluoroalkyl phosphates are difficult to prepare as pure compounds—their preparation is inherently non-selective resulting in significant amounts of undesirable dialkyl phosphates; second, phosphates in general are susceptible to degradation through hydrolysis; third, regulatory pressures have resulted in the phasing out of $C_8$ and above perfluorinated hydrocarbons and compounds bearing this substituent, such as $CF_3(CF_2)_7CH_2CH_2OPO_3^{-2}$, which is targeted to be banned as an additive in binder systems in 2015. Accordingly, it would be desirable to find efficient fluorinated surfactants that overcome the objections to fluoroalkyl phosphates while maintaining or improving the block performance of binders.

SUMMARY OF THE INVENTION

The present invention addresses a need in the art by providing a composition comprising an aqueous dispersion of a binder and a salt of the following fluoroalkyl phosphonic acid:

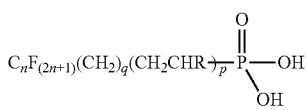

wherein R is H or $C_1$-$C_6$-alkyl; n is 2 to 6; q is 0 or 1; and p is 0 to 10, with the proviso that at least one of p and q is not 0; and wherein the concentration of the salt of the fluoroalkyl phosphonic acid salt is from 0.01 to 3 weight percent based on the weight of the binder The composition of the present invention addresses a need by comprising a surfactant that is easily prepared in high purity, that is stable to hydrolysis, and that is more environmentally friendly than its phosphate counterpart.

DETAILED DESCRIPTION OF THE INVENTION

The present invention is a composition comprising an aqueous dispersion of a binder and a salt of the following fluoroalkyl phosphonic acid:

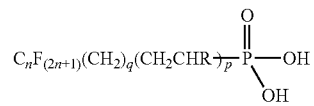

wherein R is H or $C_1$-$C_6$-alkyl; n is 2 to 6; q is 0 or 1; and p is 0 to 10, with the proviso that at least one of p and q is not 0; and wherein the concentration of the salt of the fluoroalkyl phosphonic acid salt is from 0.01 to 3 weight percent based on the weight of the binder. R is preferably H, q is preferably 0, and p is preferably 1 to 10.

Preferably, the fluoroalkyl phosphonic acid salt is characterized by the following formula:

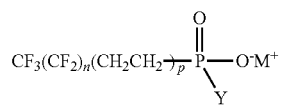

wherein Y is OH or $O^-M^+$, preferably $O^-M^+$; n is preferably 3 to 5, more preferably 3 or 5; p is more preferably 1 to 5, more preferably 1 to 3, and most preferably 1; wherein each $M^+$ is preferably an alkali metal cation such as $Na^+$ or $K^+$, or an ammonium cation such as $NH_4^+$, N-(2-hydroxyethyl)ammonium, N,N-di(2-hydroxyethyl)ammonium, N,N,N-tri(2-hydroxyethyl)ammonium, trimethylammonium, and triethylammonium.

The fluoroalkyl phosphonic acid salt can be prepared in accordance with the following scheme:

Scheme 1.

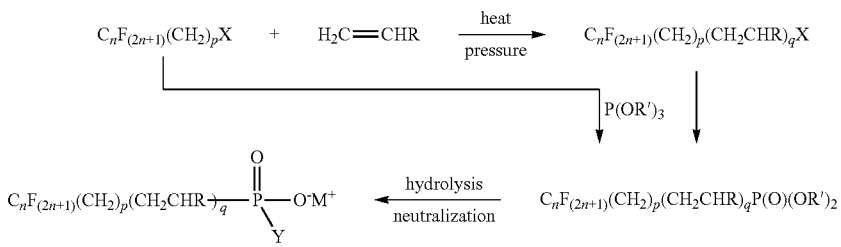

where X is a leaving group such as sulfonate, phosphorane, bromo, or iodo; R' is an alkyl group, preferably a $C_1$-$C_4$-alkyl group, more preferably ethyl; p is 0 or 1; and q is 0 to 10; when q is 0 (i.e., when $C_nF_{(2n+1)}(CH_2)_pX$ is reacted directly with $P(OR)_3$ in the first step), p is 1. The preparation of $C_nF_{(2n+1)}$ $(CH_2)_p(CH_2CHR)_qX$ can be carried out at high temperature and pressure as disclosed in U.S. Pat. No. 7,815,816. The penultimate product is a phosphonic acid which can be conveniently neutralized to the corresponding phosphonate with a suitable base, which may be inorganic or organic. Preferably the base is an amine or an aminoalcohol.

The binder is preferably a stable aqueous dispersion of polymer particles having a $T_g$ in the range of from −60° C. to 60° C., and can be any binder suitable for coatings compositions, including aqueous dispersions of acrylic, styrene-acrylic, vinyl ester-acrylic, vinyl ester-ethylene, silicone, urethane, vinylidene halide, and vinyl halide polymer particles. The concentration of the fluoroalkyl phosphonate is preferably from 0.01, more preferably from 0.02 weight percent, to preferably 0.5, more preferably to 0.2, and most preferably to 0.1 weight percent based on the weight of the binder solids.

The composition is preferably suitable for coating composition, preferably a paint. As such, the composition may include a number of additional materials including solvents; pigments such as unencapsulated or partially or completely encapsulated $TiO_2$; fillers; defoamers; surfactants; dispersants; thickeners; coalescents; colorants; preservatives; flow agents; leveling agents; and neutralizers. It has been discovered that compositions containing the fluoroalkyl phosphonates described herein show excellent block resistance without the drawbacks of fluoroalkyl phosphates.

EXAMPLES

The following examples are for illustrative purposes only and are not intended to limit the scope of the invention.

Table 1 is a list of materials and their abbreviations

| | |
|---|---|
| Ti Pure R-746 TiO$_2$ Slurry | TiO$_2$ R-746 |
| Ti Pure R-706 TiO$_2$ Powder | TiO$_2$ R-706 |
| Foamstar A34 Defoamer | Defoamer |
| RHOPLEX ™ AC-261LF Acrylic Binder | AC-261LF |
| RHOPLEX ™ AC-337N Acrylic Binder | AC-337N |
| Texanol Coalescent | Texanol |
| Optifilm Enhancer 400 Coalescent | Optifilm |
| Byk-348 Silicone Surfactant | Byk-348 |
| TERGITOL ™ TMN 100X Nonionic Surfactant | Nonionic Surfactant |
| TAMOL ™ 1124 Dispersant | Dispersant |
| AMP ™-95 Amine | AMP-95 |
| PRIMAL ™ SF-155 Styrene-acrylic binder | SF-155 |
| ACRYSOL ™ RM-2020NPR Thickener | RM-2020 |
| ACRYSOL ™ RM-5000 Thickener | RM-5000 |
| ACRYSOL ™ TT-615 Thickener | TT-615 |
| ACRYSOL ™ RM-895 Thickener | RM-895 |
| ACRYSOL ™ RM-8W | RM-8W |
| ACRYSOL ™ DR-5500 Thickener | DR-5500 |

RHOPLEX, TERGITOL, TAMOL, PRIMAL, AND ACRYSOL are all Trademarks of The Dow Chemical Company or its Affiliates.

Intermediate 1—Preparation of Perfluorohexylethyl Phosphonate Salt Solution

Deionized water (8.81 g) was added to perfluorohexylethyl phosphonic acid (2.00 g). Ethanolamine (1.00 g) was then added and the mixture was gently stirred to produce a clear solution.

Intermediate 2—Preparation of a Nonafluorohexyl Phosphonic Acid Salt

Neat 1,1,1,2,2,3,3,4,4-nonafluoro-6-iodohexane (10 mmol) was added to 50 mmol of triethyl phosphate. The reaction mixture was heated at 160° C. overnight to produce diethyl(3,3,4,4,5,5,6,6,6-nonafluorohexyl)phosphonate, which was isolated by fractional distillation (90-95% yield).

Neat trimethylsilyl bromide (21 mmol) was added slowly to a solution of diethyl(3,3,4,4,5,5,6,6,6-nonafluorohexyl)phosphonate (7 mmol) in dry $CH_2Cl_2$ (25 mL) at 0° C. The reaction mixture was stirred overnight at room temperature, after which time water (30 mmol) was added to the reaction mixture. Volatiles were removed in vacuo leaving (3,3,4,4,5,5,6,6,6-nonafluorohexyl)phosphonic acid as a white crystal (>95% yield). The procedure for producing the phosphonic acid salt was similar as described for Intermediate 1.

Coating Formulations

Comparative Example 1

The composition for Comparative Example 1 is described in Table 2. The composition was prepared without any block additive. The coating was prepared in two stages, a grinding stage and a let-down stage. Grinding was carried out in using a Cowls disperser. In a 1-liter stainless steel container, water (110.00 g), defoamer (1.00 g), nonionic surfactant (2.23 g), and dispersant (6.08 g) were mixed for 1-2 min. Next, under very high speed stirring (1000 rpm), TiO$_2$R-706 (322.07) was added slowly over 5 min. Dispersion was continued for an additional 10-15 min at 1200 rpm. Uniform dispersion of TiO$_2$ was confirmed using a Hegman gauge. After grinding, let-down was carried out using an overhead stirrer.

In let-down stage, a portion of the grind (441.38 g) was added into AC-261LF (468.80 g) in a 1-liter plastic container under slow stirring. Defoamer (2.01 g) and Optifilm (11.75 g) were added to the mixture and continued mixing for additional 2-3 min. Next, a portion of RM-5000 (20.00 g) and water (50.00 g) were added under high speed stirring. The remainder of RM-5000 (21.09 g) and water (50.00 g) were added to the mixture with continued high speed stirring. Next, RM-895 (6.01 g) was added to the mixture followed by addition of ammonia (0.30 g, 28% aqueous) and water (37.06 g) to adjust the final pH and viscosity.

TABLE 2

| Compositional of Comparative Example 1 | | |
|---|---|---|
| Stage | Materials | Wt (g) |
| Grind | TiO$_2$ R-706 | 322.07 |
| | Water | 110.00 |
| | Defoamer | 1.00 |
| | Nonionic surfactant | 2.23 |
| | Dispersant | 6.08 |
| | Grind Sub-total | 441.38 |
| Let-down | AC-261LF | 468.80 |
| | Defoamer | 2.01 |
| | Ammonia (28%) | 0.30 |
| | Optifilm | 11.75 |
| | RM-5000 | 41.09 |
| | RM-895 | 6.01 |
| | Water | 137.06 |
| | Total | 1108.39 |

Comparative Example 2

Comparative 2 was also prepared without any block additive (i.e., without using Intermediates 1 or 2). The composition is described in Table 3.

Grinding was carried out in a plastic container using an overhead stirrer. First, propylene glycol (32.00 g), water (18.00 g), defoamer (1.00 g), and dispersant (4.00 g) were mixed for 1-2 min. Next, TiO$_2$ R-746 (300.72 g) was added slowly over 3 min. Dispersion was continued for an additional 5 min. After the grinding step, the let-down was carried out following substantially the same procedure described in Comparative Example 1. A portion of the AMP-95 was added prior to the addition of DR-5500 and TT-615 and the balance was added at the end to adjust the final pH.

TABLE 3

Composition of Comparative Example 2.

| Stage | Materials | Wt (g) |
|---|---|---|
| Grind | TiO₂ R-746 | 300.72 |
| | Propylene glycol | 32.00 |
| | Water | 18.00 |
| | Defoamer | 1.00 |
| | Dispersant | 4.00 |
| | Grind Sub-total | 355.72 |
| Let-down | AC-337N | 569.47 |
| | Defoamer | 2.01 |
| | AMP-95 | 4.10 |
| | Optifilm | 12.96 |
| | DR-5500 | 22.5 |
| | TT-615 | 1.97 |
| | Water | 68.53 |
| | Total | 1037.26 |

Comparative Example 3 was also prepared without any block additive (i.e., without using Intermediates 1 or 2). The composition is described in Table 4. The procedure of preparing Comparative Example 3 was substantially the same as described for Comparative 2.

TABLE 4

Compositional details of Comparative Example 3

| Materials | Wt (g) |
|---|---|
| TiO₂ R-746 | 274.97 |
| Defoamer | 1.35 |
| Byk-348 | 3.20 |
| SF-155 | 546.51 |
| Ammonia (28%) | 0.60 |
| Texanol | 7.71 |
| RM-2020NPR | 24.00 |
| RM-8W | 10.60 |
| Water | 140.71 |
| Total | 1009.65 |

Example 1

Preparation of Paint Composition Containing Block Additive

In a 120 mL plastic container, Intermediate 1 (0.0626 g) was mixed with the composition of Comparative Example 1 (100 g) using a Miller GyroMixer for 9 min.

Example 2

Preparation of Paint Composition Containing Block Additive

The procedure for preparing the paint composition of Example 2 is substantially as described for the preparation of the Example 1 paint composition except that 0.1251 g of Intermediate 1 was used.

Final pH values of control and experimental coatings were ~8.9. Coatings were stored at room temperature for 48-72 h before application.

Examples 3-6

Preparation of Paint Composition Containing Block Additive

Examples 3-6 were prepared by adding Intermediate 1 to the composition of Comparative Example 2, as described in Example 1.

Examples 7 and 8

Preparation of Paint Composition Containing Block Additive

Examples 7 and 8 were prepared by adding Intermediate 1 to the composition of Comparative Example 3, as described in Example 1.

Examples 9 and 10

Preparation of Paint Composition Containing Block Additive

Examples 9 and 10 were prepared by adding Intermediate 2 to the composition of Comparative Example 1, as described in Example 1.

Coating Applications

Drawdowns of the coatings were prepared at 25° C. and 50% relative humidity (RH) using a 3-mil bird applicator over a white Leneta chart. The coatings were dried for 24 h at 25° C. and 50% RH before performing block resistance measurements.

Test Methods

The following test methods were used to characterize the coatings.

ASTM D4946-89 was followed to perform peel block resistance. For each coating, twelve 1.5"×1.5" sections were cut from the chart to run triplicates for room temperature and hot block. Two each of the cut squares were placed face-to-face, with paint surfaces in contact with each other. For room temperature block testing, for each pair of square on a flat surface, a rubber stopper (No. 8) was placed on the top with the narrow side in contact with the specimens. A 1000 g of weight was placed on the top of the stopper. After 30 min, the weights and stoppers removed from the specimens, which were then tested for room temperature block resistance. For hot block, specimens were placed in an oven at 50° C. on a flat metal plate. Rubber stoppers (No. 8) and weights were equilibrated in the oven. A rubber stopper was placed with narrow side down on top each specimen in the oven. Then, a 1000-g weight was placed over each stopper. After 30 min, weights and stoppers were removed and the specimens were removed from the oven and allowed to cool at room temperature for 30 min before testing for hot block resistance. The results of room temperature block and hot block were reported on a scale of 0 to 10 by peeling apart the specimens with slow and steady force. Table 5 describes the rating system for reporting peel block resistance.

TABLE 5

Description of tack and seal for rating block resistance.

| Rating | Description of tack and seal |
|---|---|
| 10 | No tack, perfect |
| 9 | Trace tack, excellent |
| 8 | Slight tack, very good |
| 7 | Slight tack, good |
| 6 | Moderate tack, good |
| 5 | Moderate tack, fair |
| 4 | Severe tack, no seal, fair |
| 3 | 5-25% seal, poor |
| 2 | 25-50% seal, poor |
| 1 | 50-75% seal, poor |
| 0 | Complete seal, very poor |

Table 6 summarizes block resistance for coatings from formulations of Comparative Example 1 and Examples 1 and 2.

TABLE 6

Block Properties of Coatings using AC-261LF Binder

| | | Additive conc. | Block resistance (after 24 hr drying at 25° C. and 50% RH) | |
|---|---|---|---|---|
| Coating ID | Block additive | (wt % w.r.t. binder solid) | Room temperature | Hot block |
| Comp. Ex. 1 | None | 0.00 | 1 | 0 |
| Ex. 1 | Intermediate 1 | 0.05 | 8 | 7 |
| Ex. 2 | Intermediate 1 | 0.10 | 8 | 7 |

The results show that the coatings from formulations with perfluorohexylethyl phosphonate showed a significant improvement in block resistance as compared to the formulation containing no block additive, both at room temperature and hot block.

Table 7 illustrates block resistance for coatings from formulations of Comparative 2 and Examples 3 to 6. Perfluor0hexylethylphosphonate salt solution. as a post additive showed a significant improvement in block resistance, both room temperature and hot block, compared to Comparative Example 2.

TABLE 7

Block Properties of Coatings using binder Rhoplex AC-337N Binder

| | | Additive conc. | Block resistance (after 24 h drying at 25° C. and 50% RH) | |
|---|---|---|---|---|
| Coating ID | Block additive | (wt % w.r.t. binder solid) | Room temperature | Hot block |
| Comp. Ex 2 | None | 0.00 | 5 | 2 |
| Ex. 3 | Intermediate 1 | 0.025 | 8 | 6 |
| Ex. 4 | Intermediate 1 | 0.050 | 9 | 8 |
| Ex. 5 | Intermediate 1 | 0.075 | 9 | 8 |
| Ex. 6 | Intermediate 1 | 0.100 | 9 | 8 |

Table 8 shows block resistance for coatings from formulations of Comparative Example 3 and Examples 7 and 8.

TABLE 8

Block Properties of Coatings using a SF-155 Binder

| | | Additive conc. | Block resistance (after 24 hr drying at 25° C. and 50% RH) | |
|---|---|---|---|---|
| Coating ID | Block additive | (wt % w.r.t. binder solid) | Room temperature | Hot block |
| Comp. Ex. 3 | None | 0.00 | 4 | 0 |
| Ex. 7 | Intermediate 1 | 0.05 | 7 | 6 |
| Ex. 8 | Intermediate 1 | 0.10 | 7 | 6 |

As Table 8 shows, post-addition of Intermediate 1 showed a significant improvement in block resistance, both room temperature and hot block, compared to Comparative 3 for a styrene-acrylic binder.

Table 9 shows block resistance for coatings from formulations of Comparative Example 1 and Examples 9 and 10.

TABLE 9

Block Properties of Coatings using a Binder AC-261LF Binder

| | | Additive conc. | Block resistance (after 24 h drying at 25° C. and 50% RH) | |
|---|---|---|---|---|
| Coating ID | Block additive | (wt % w.r.t. binder solid) | Room temperature | Hot block |
| Comp. Ex 1 | None | 0.00 | 1 | 0 |
| Ex. 9 | Intermediate 2 | 0.05 | 8 | 6 |
| Ex. 10 | Intermediate 2 | 0.10 | 8 | 6 |

Table 9 shows that the use of Intermediate 2 as a post additive showed a significant improvement in block resistance, both room temperature and hot block, as compared to Comparative Example 1.

It has been demonstrated that fluoroalkyl phosphonates can be used to provide coating formulations with excellent block resistance. Moreover, this additive can readily be prepared in high yield and purity and is stable to hydrolysis. As such, it offers a viable alternative to fluoroalkyl phosphates.

The invention claimed is:

1. A composition comprising a binder, which is a stable aqueous dispersion of polymer particles, and a salt of the following fluoroalkyl phosphonic acid:

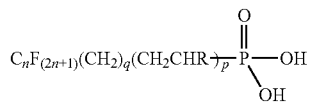

wherein R is H or $C_1$-$C_6$-alkyl; n is 2 to 6; q is 0 or 1; and p is 0 to 10, with the proviso that at least one of p and q is not 0; and wherein the concentration of the salt of the fluoroalkyl phosphonic acid is from 0.01 to 3 weight percent based on the weight of binder solids, wherein the binder is an acrylic binder, a styrene acrylic binder, or a vinyl ester acrylic binder, wherein the composition is a coating composition.

2. The composition of claim 1 wherein the salt of the fluoroalkyl phosphonic acid is represented by the following formula:

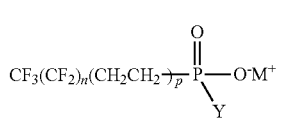

wherein Y is OH or $O^-M^+$; n is 3 to 5; where p is 1 to 5; each $M^+$ is an alkali metal or ammonium cation; and the concentration of the salt of the fluoroalkyl phosphonic acid is from 0.01 to 0.5 weight percent based on the weight of the binder.

3. The composition of claim 2 wherein Y is $O^-M^+$; each $M^+$ is an ammonium cation; and the concentration of the salt of the fluoroalkyl phosphonic acid is from 0.02 to 0.2 weight percent based on the weight of the binder.

4. The composition of claim 2 wherein p is 1; n is 3 or 5; each $M^+$ is selected from the group consisting of $NH_4^+$, N-(2-hydroxyethyl)ammonium, N,N-di(2-hydroxyethyl)ammonium, N,N,N-tri(2-hydroxyethyl)ammonium, trimethylammonium, and triethylammonium; and the binder is an acrylic or a styrene-acrylic polymeric binder.

5. The composition of claim 1 which further includes one or more materials selected from the group consisting of pigments, fillers, defoamers, surfactants, dispersants, thickeners, coalesecents, colorants, preservatives, flow agents, leveling agents, and neutralizers.

6. The composition of claim 1 which further comprises $TiO_2$, a coalescent, a surfactant, a dispersant, a thickener, a defoamer, and a neutralizer.

* * * * *